UNITED STATES PATENT OFFICE.

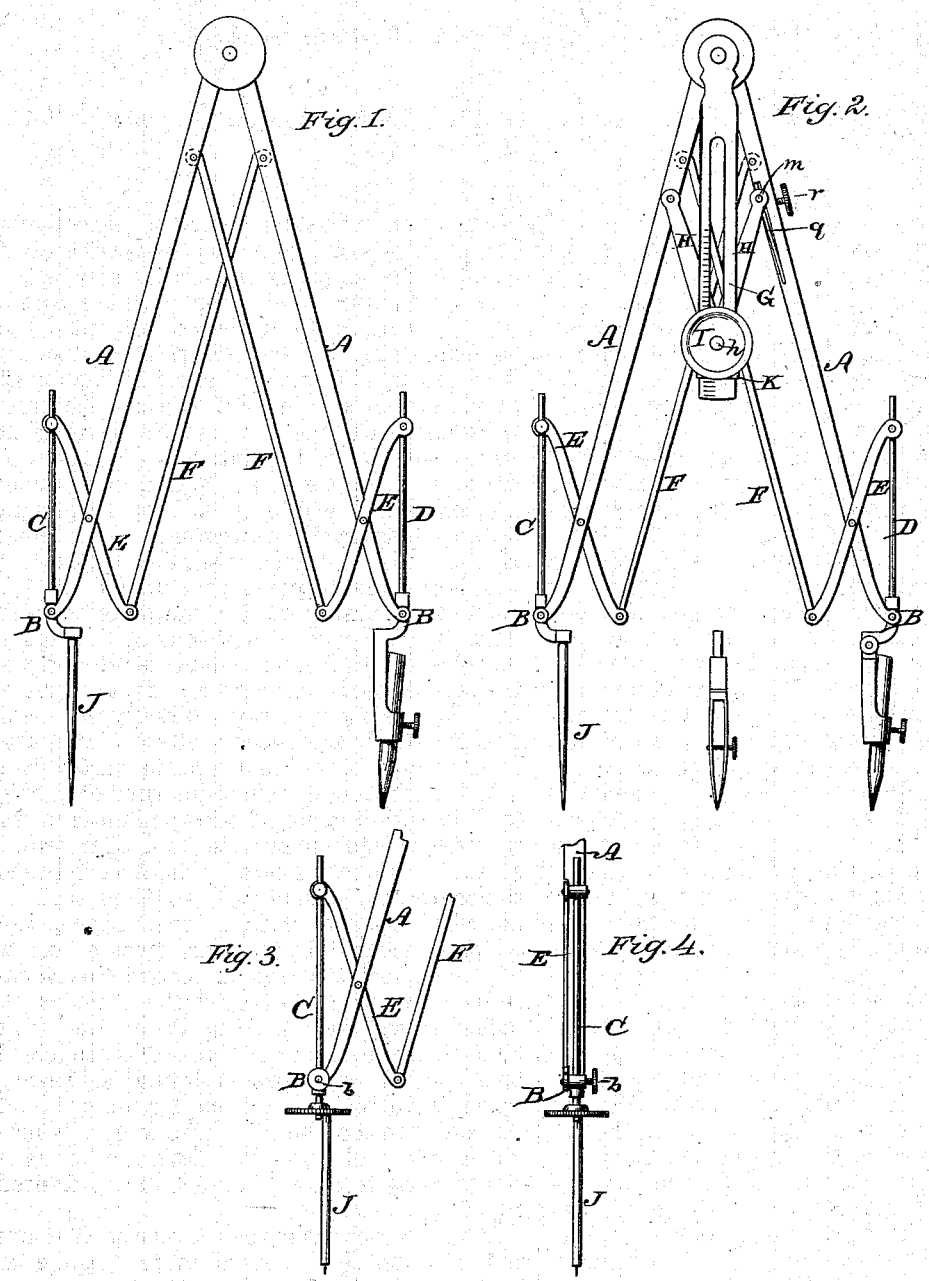

JOHN B. FRICKE, OF PINE ISLAND, MINNESOTA.

IMPROVEMENT IN DRAFTSMEN'S COMPASSES.

Specification forming part of Letters Patent No. 186,419, dated January 23, 1877; application filed November 1, 1876.

*To all whom it may concern:*

Be it known that I, JOHN B. FRICKE, of Pine Island, in the county of Goodhue and State of Minnesota, have invented a new and useful Improvement in Draftsmens' Compasses; and I do hereby declare the following to be a full, clear, and exact description of the same, reference being had to the accompanying drawings, in which—

Figure 1 is an elevation of my invention. Fig. 2 is a similar elevation, with scale parts added. Figs. 3 and 4 represent the adjustable center-point.

The object of this invention is to secure a constant parallelism between the axes of the center-point and the pencil or pen point or rod; and it consists, first, in a series of braces jointed directly to, and parallel with, the compass-legs, and cross-levers operated by said braces, to maintain the point and pencil-rods in true parallelism, in contradistinction to a system of parallel braces jointed to each other and to intermediate parts; second, in the graduated index-slide and set-nut; third, in an eccentric center-point to adjust the center and pen points to each other; fourth, in an adjustable joint-connection between one of the index arms and the compass-leg, to adjust the index as to the distance between the points.

That others may fully understand my invention, I will particularly describe it.

Every draftsman knows the disadvantages of the inclined legs of the ordinary compasses in inscribing circles, and the difficulty of obtaining accurate results therewith. Yet the convenient form and compactness of the implement renders it indispensable. My improvement combines in one instrument the convenience of the ordinary joint-leg compass and the accuracy of the beam-compass by attaching the center and scribing points to moving rods supported by jointed braces, which are automatically maintained in parallelism throughout all movements of the compass-legs.

A A are the compass-legs jointed together at their upper ends, as usual. At their lower ends are jointed or swivel feet B B, through which the center-point and pencil-point rods C D are passed, and may be secured by clamp-screws *b b*. The cross-levers E E are pivoted at their centers to the legs A A, respectively, at points distant from the swivel-feet B B equal to the length of one arm of said levers; and at their inner ends said levers are jointed to the braces F F, which are jointed to the opposite leg A, respectively, at a distance from the axis of said leg equal to the length of one arm of said lever E, so that said brace is parallel with one leg, and the lever E, to which said brace is jointed, is parallel with the other or opposite leg; and these relations are constant at whatever angle said legs may be to each other. The outer ends of the levers E E are provided with swivel-heads, through which the center-point or pencil-rods C D pass; and these rods are, therefore, parallel with each other in all positions of the legs A A. The braces F F are connected directly to the legs A A at their upper ends, and, therefore, receive their motions directly and positively without reference to intermediate parts or additional braces to maintain parallelism.

It is desirable that every instrument should contain within itself all the appliances necessary to its convenient use, and, therefore, I attach a scale to indicate the distance between the center and pencil points. This scale is inscribed upon a plate, G, the upper end of which is secured by the axis rivet or screw which connect the legs A A, and the index-slide K, which moves over the scale, is attached to the legs A A by the jointed arms H H. The index ends of these arms are joined by a screw, *h*, which passes through said arms, through said slide, and through a longitudinal guide-slot in the plate G. The screw *h* is provided with a thumb-nut, I, and serves as a clamp-screw to retain the legs in any desired adjustment.

It will be observed that the arms H H are at their outer ends jointed to the legs A A directly, and that they do not in any way control the parallelisms of the pencil and center points.

In instruments of this kind there is always a liability to slight derangements on account of accidental bending of parts, &c., and these derangements will naturally throw the scale G out of adjustment, and I therefore make one of its joint-connections movable, so that the position of the index-slide K may be slightly shifted without moving the legs A A, and in that way apply the proper correction. Therefore the joint m of the arm H is attached to a spring, q, one end of which is rigidly attached to the leg A, and the other end supported upon the backing-screw r, whereby the arm-joint may be shifted in position and the index-slide K caused to move over the scale. An accidental bending of the point J, or to correct a slight eccentricity of the point as to its shoulder, as shown in Figs. 3 and 4, requires an independent adjustment of said point, and I accomplish the same by making said point eccentric to its rod C, as shown in Figs. 3 and 4, whereby a revolution of the same may be caused to correct any error such as mentioned.

Having described my invention, what I claim as new is—

1. The compass-legs A A, jointed together at their upper ends, combined with levers E E, braces F F, and rods C D, mounted in swivel-heads, substantially as and for the purpose set forth.

2. The compass-legs A A, combined with the scale-plate G, index-slide K, and arms H H, jointed to said legs A A, and secured by the clamp-screw I, for the purpose set forth.

3. The compass-legs A A, parallel braces F F, and levers E E, combined with the center-point J, eccentric to its rod C, for the purpose of adjustment of points to scale, as set forth.

4. The compass-legs A A, jointed together at their upper ends, and the cross-levers E E jointed to said legs near their lower ends, combined with the braces F F jointed to the inner ends of said levers and directly to the opposite legs A, respectively, as set forth.

JOHN B. FRICKE.

Witnesses:
MARION HAGLER,
S. P. CAMPBELL.